(No Model.)
T. GRIFFIN & H. WINBORNE.
COTTON PRESS.
No. 244,592. Patented July 19, 1881.
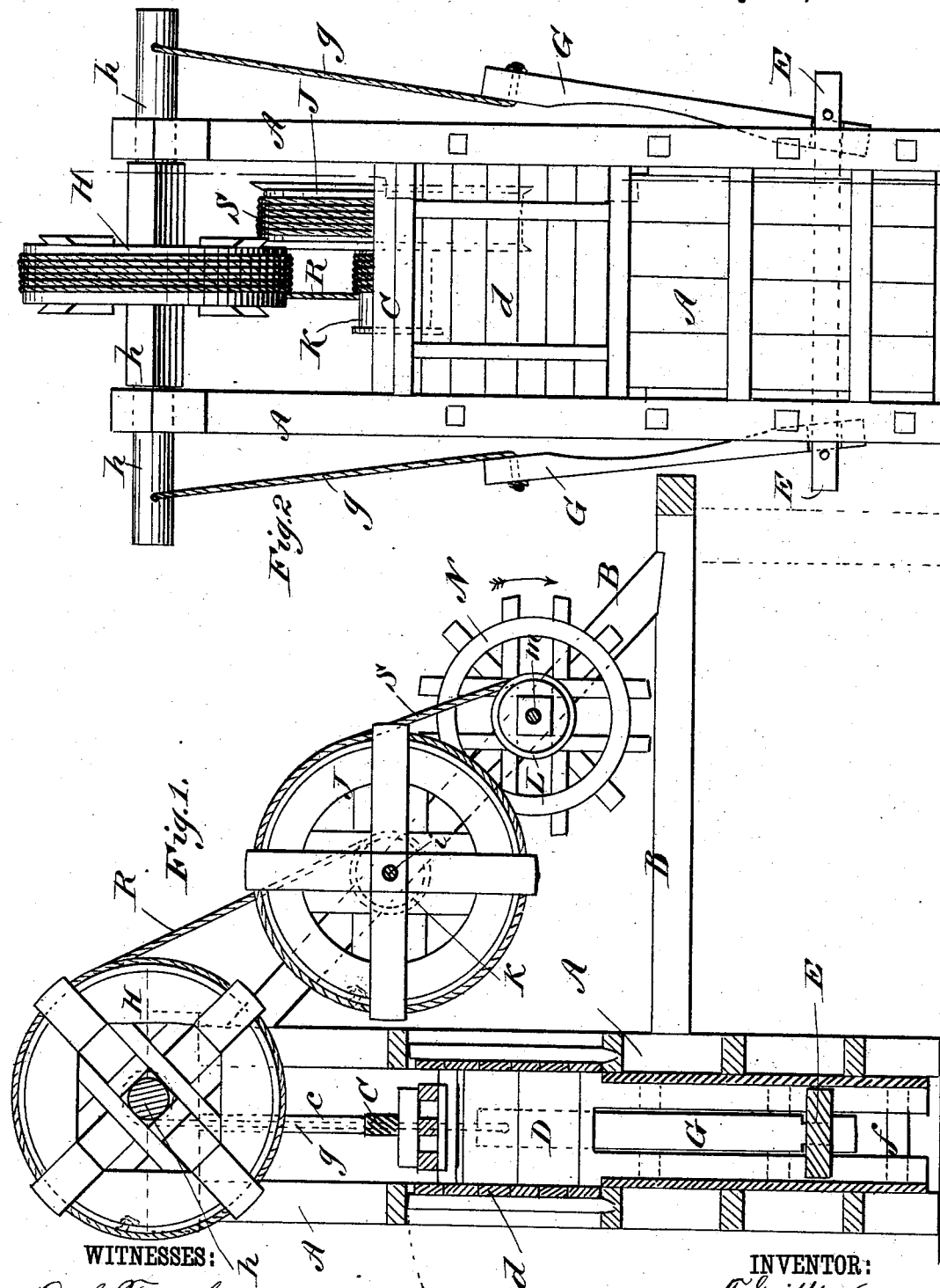
WITNESSES:
D. J. Twitchell
C. Sedgwick
INVENTOR:
T. Griffin
H. Winborne
BY Munn & Co
ATTORNEYS.
N. PETERS, Photo-Lithographer, Washington, D. C.

UNITED STATES PATENT OFFICE.

THEOPHILUS GRIFFIN, OF SCOTLAND NECK, AND HENRY WINBORNE, OF TARBOROUGH, N. C.; SAID GRIFFIN ASSIGNOR TO SAID WINBORNE.

COTTON-PRESS.

SPECIFICATION forming part of Letters Patent No. 244,592, dated July 19, 1881.

Application filed June 4, 1881. (No model.)

*To all whom it may concern:*

Be it known that we, THEOPHILUS GRIFFIN, of Scotland Neck, in the county of Halifax and State of North Carolina, and HENRY WINBORNE, of Tarborough, in the county of Edgecombe and State of North Carolina, have invented a new and useful Improvement in Cotton-Presses, of which the following is a full, clear, and exact description.

This invention relates to a mode of operating a cotton-press by means of ropes and windlasses.

The invention consists in a novel arrangement and combination of ropes and windlasses, whereby great power is obtained, and in certain details of construction hereinafter described.

In the accompanying drawings, Figure 1 is a vertical sectional view of an apparatus constructed according to our invention. Fig. 2 is a rear view of the same.

A represents a vertical frame-work, and B a triangular frame-work attached to one side thereof.

About midway of the height of the frame A is the box D for the reception of the bale to be pressed. This box is provided with a removable door, $d$, on one side. The top of the box is held firmly in place by means of a bar, C, and upright posts $c$. The bottom of the box is open.

In the lower portion of the frame A, below the bottom of the box, are two slots, $f$, one on each side. In these slots work the ends of a follower, E, which forms the bottom of the box.

To the ends of the follower E are attached the lower ends of two rods or bars, G.

To the upper ends of the rods or bars G are attached the lower ends of ropes $g$, the upper ends of which are attached to the ends of a shaft, $h$, journaled in the upper part of the frame A, and carrying a windlass or large wheel, H.

In the side frame, B, is journaled a shaft, $i$, which carries a windlass or large wheel, J, and a drum or small wheel, K.

In the side frame, B, lower down than the shaft $i$, is journaled a shaft, $m$, which carries a drum or small wheel, L, and a wheel, N, provided with hand-spokes, or with sockets for the reception of levers.

A rope, R, has one end attached to the wheel H and the other end attached to the drum K, and a rope, S, has one end attached to the wheel J and the other end attached to the drum L.

When the parts are in position to receive the bale to be pressed the follower E is near the bottom of the frame A, the rope R is wound on the wheel H, and the rope S is wound on the wheel J. By turning the hand-wheel N the rope S is wound on the drum L and unwound from the wheel J, and the rope R is wound on the drum K and unwound from the wheel H, thus causing the shaft $h$ to turn and wind upon it the ropes $g$ and draw the follower E upward to press the bale.

Having thus fully described our invention, we claim as new and desire to secure by Letters Patent—

In an apparatus for pressing cotton and for similar purposes, the combination of a shaft, $h$, carrying a wheel or windlass, H, a shaft, $i$, carrying a wheel, J, and drum K, a rope, R, attached to wheel H and drum K, a shaft, $m$, carrying a drum, L, and hand-wheel N, and a rope, S, attached to wheel J and drum L, all arranged and operating as herein shown and described.

THEOPHILUS $\overset{his}{\times}$ GRIFFIN.
mark.
HEY. WINBORNE.

Witnesses:
W. A. DUGGAN,
JOHN C. MADDRA.